United States Patent [19]
Adkar

[11] 3,728,525
[45] Apr. 17, 1973

[54] MAGNETIC NAVIGATION SYSTEM

[75] Inventor: Chintamani K. Adkar, Pierrefonds, Canada

[73] Assignee: The United States of America as represented by the Secretary of the Navy

[22] Filed: Oct. 19, 1971

[21] Appl. No.: 190,592

[52] U.S. Cl. ...... 235/150.271, 235/150.27, 244/77 B, 324/0.5 E, 324/0.5 F, 324/4, 324/47
[51] Int. Cl. ...... G01c 21/08, G01r 33/02, G01v 3/14
[58] Field of Search ............... 235/150.27, 150.271; 244/77 B; 324/0.5 E, 0.5 F, 47, 4, 5, 6, 7, 8

[56] References Cited

UNITED STATES PATENTS 3,443,208  6/1969  Webb .................. 324/0.5 F UX
3,415,980  12/1968  Maieli et al. .................. 235/150.271

Primary Examiner—Malcolm A. Morrison
Assistant Examiner—R. Stephen Dildine, Jr.
Attorney—R. S. Sciascia et al.

[57] ABSTRACT

A magnetometer mounted on a vehicle is used for sensing the earth's ambient magnetic field. Various magnetic fields in specified planes are generated and applied to the magnetometer in addition to the earth's field for obtaining fixed magnetic deviations in the specified planes. Various arithmetic operations to the measured values of the ambient and generated magnetic fields provide addition parameters that may be used for determining the geographic location of the vehicle.

10 Claims, 4 Drawing Figures

INVENTOR.
CHINTAMANI K. ADKAR
BY
ATTORNEY

MAGNETIC NAVIGATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to navigational instrumentation and more particularly to a magnetic navigation system utilizing the earth's ambient magnetic field to determine the location of a vehicle.

Celestial and radio navigation systems presently enjoy widespread usage. However, both types of systems have well-known problems associated with them. The former is useful only when weather conditions permit and the latter is subject to difficulties caused by radio interference.

SUMMARY OF THE INVENTION

Accordingly, it is a general purpose and object of the present invention to provide an improved navigation system for determining the position of a vehicle on or above the surface of the earth by means of the characteristics of the earth's magnetic field. It is a further object to provide a magnetic navigation system generally passive with respect to its sensing instrumentation and not subject to radio interference or adverse weather conditions.

This is accomplished according to the present invention by detecting the ambient earth's magnetic field and generating fixed magnetic fields in three orthogonal planes to provide magnetic deviations in the sensed field. Additional parameters are then available through arithmetic computation by sensing the change in total field when the above fixed magnetic fields are applied. By pulling out the ambient field along one of the three orthogonal planes and generating a slight deviation in one of the other two planes, the total field, inclination, horizontal component, vertical component, and declination are available for comparison with maps and charts to locate the precise location of the vehicle on the earth's surface.

DESCRIPTION OF THE PREFERRED EMBODIMENT

A study of existing charts and maps giving information on magnetic parameters on the earth's surface appear to indicate that approximately 69 percent of the earth's surface area can be identified with substantial accuracy if only the total ambient magnetic field of the earth and its horizontal component are known. If the declination angle (the angle between true heading and magnetic heading) becomes known, in addition to the other two parameters, then the area of the earth's surface that can be identified increases to 85 percent. If knowledge of the vertical component of the earth's magnetic field and the inclination angle (the angle a vector representing the total ambient magnetic field makes with its trace on a horizontal plane) subsequently become known then approximately 97 percent of the earth's surface may be identified with a greater degree of accuracy.

Figure 1:
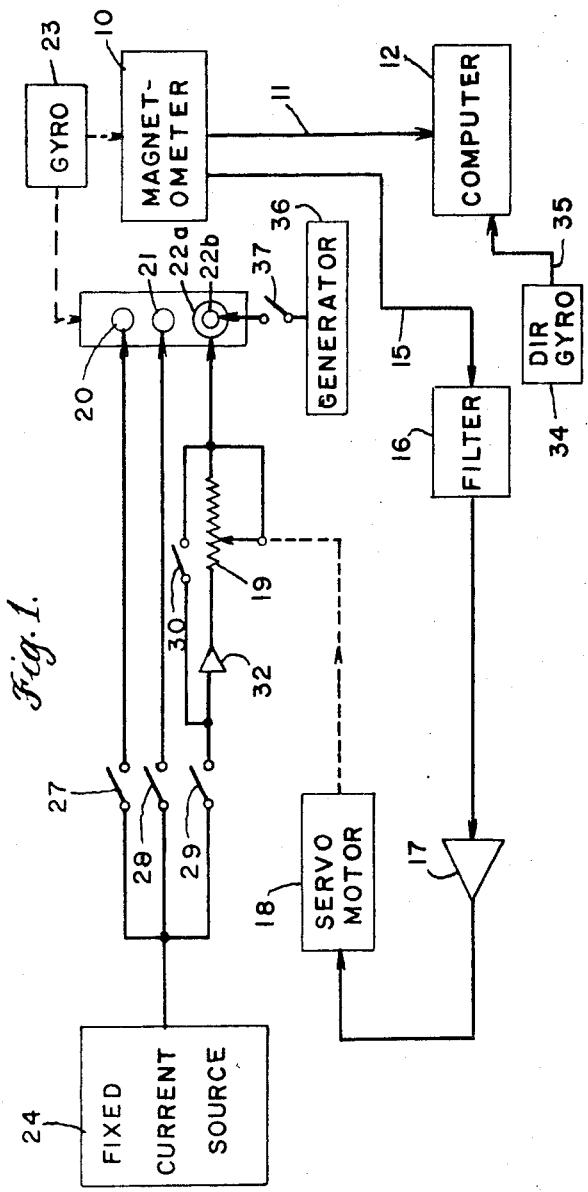
FIG. 1 is a schematic and block diagram of a preferred embodiment of a magnetic navigation system according to the present invention.

Referring now to the FIG. 1, a total field optically pumped magnetometer 10 vertically stabilized by a gyro 23 senses the earth's ambient magnetic field and generates output signals 11 and 15 proportional to the measured magnetic field in digital and analog form, respectively. Digital signal 11 is transmitted to a digital computer 12 which may be of any general purpose type. Analog signal 15 is transmitted to bandpass filter 16 which passes signals of frequency $\omega$. The output from filter 16 is applied to an amplifier 17 which drives a servometer 18 which in turn positions a wiper on potentiometer 19. Three sets of orthogonally mounted Helmholtz coils 20, 21 and 22a, also stabilized by gyro 23 are located to affect the $F_x$, $F_y$ and $F_z$ fields, respectively, about magnetometer 10.

A fixed current source 24 selectively provides signals to coils 20, 21 and 22a through respective manual switches 27, 28 and 29. Switch 29 is connected to coil 22a through a manual switch 30, and also through an amplifier 32 and potentiometer 19 in parallel with switch 30. A directional gyro 34 provides a digital signal 35 indicative of the true heading of the vehicle to computer 12. The output of a sine wave generator 36 is connected to coil 22b through a switch 37. Coil 22b is stabilized by gyro 23 on the same axis as coil 22a.

Figure 2:
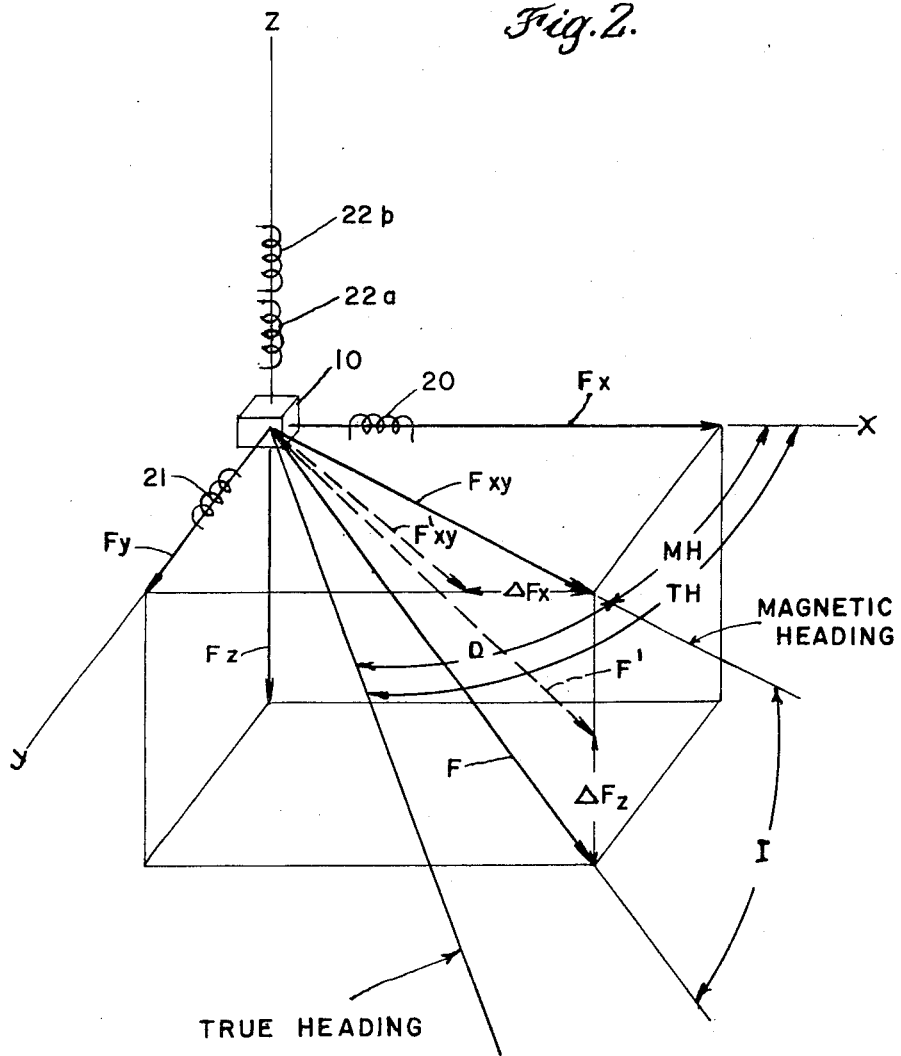
FIG. 2 represents the vector relationship of typical magnetic field parameters sensed by a magnetometer of FIG. 1.

The theory of operation of the device may best be understood with further reference to FIG. 2. Magnetometer 10 is shown centrally located at the intersection of the axes of coils 20, 21, 22a and 22b. Prior to the fixed current source 24 being applied to any of the Helmholtz coils, the ambient field sensed by the magnetometer 10 is represented by a vector F at an inclination angle from the $x,y$ horizontal plane. A known perturbation of vertical flux $\Delta F_z$ is applied to and sensed by magnetometer 10 when the current source 24 is connected to coil 22a through switches 29 and 30. The magnitude and direction of $\Delta F_z$ is known as it is dependent on the polarity and level of current from source 24 and the geometry of the coil 22a. The resultant field sensed by magnetometer 10 when the flux $\Delta F_z$ is applied is represented by F'. The change in total field made by applying a fixed flux $\Delta F_z$ is $\Delta F$. It is readily seen that:

$$\Delta F = |F| - |F'|$$

and $I = \sin^{-1} \Delta F / \Delta F_z$ assuming $\Delta F_z << F$ \hfill (1)

It may also readily be seen that the horizontal component $F_{xy}$ of the earth's magnetic field that includes both the $F_x$ and $F_y$ components can be obtained by nulling out the vertical component $F_z$ of the earth's magnetic field. This is shown by the equation:

$$\vec{F}_{xy} = \vec{F} - \vec{F}_z \hfill (2)$$

The nulling out of the $F_z$ field is described infra in the operation of the device.

FIG. 2 also shows that the vertical component of the earth's magnetic field to have the following relationships:

$$F_z = \sqrt{F^2 - F_{xy}^2} = F \sin I \qquad (3)$$

wherein $I$ is the angle the field $F$ makes with a horizontal plane. The declination $D$ is the angle between the true heading angle $TH$ as read by direction gyro 34 and the magnetometer heading angle $MH$ which is the field read by magnetometer 10 and may be expressed by the equation:

$$D = TH - MH \qquad (4)$$

Directional gyros for obtaining the true heading angle $TH$ are well known in the art. The means for determining angle $MH$ is as follows. After the $F_z$ component of the earth's magnetic field has been nulled the magnetometer 10 senses the $F_{xy}$ component of the earth's ambient field which includes both $F_x$ and $F_y$ components. A fixed magnetic deviation $\Delta F_x$ is then applied to the magnetometer 10.

From FIG. 2 it can be seen that $$MH = \cos^{-1} \Delta F_{xy}/\Delta F_x \qquad (5)$$

where $$\Delta F_{xy} = |F_{xy}| - |F'_{xy}|$$

assuming $$\Delta F_x \ll F_{xy}$$

Combining equations (4) and (5) results in the following equation:

$$D = TH - \cos^{-1} \Delta F_{xy}/\Delta F_x \qquad (6)$$

The operation of the device will now be described with reference to the figures. The total ambient field $F$ is measured by the total field magnetometer 10 and stored in the memory of computer 12. A calibrated current source is provided from fixed current source 24 to the coil 22a through switches 29 and 30 which have been manually closed. The magnetometer 10 senses a change in signal due to the current applied to coil 22 and provides a new signal $F'$ to computer 12. The computer performs the computation $|F| - |F'|$ to obtain a value $\Delta F$ which the computer 12 stores. The value of the inclination angle $I$ is then solved by the computer 12 using equation (1). The computer 12 then solves for the vertical component $F_z$ by equation (3).

Switch 30 is then opened so that current is now provided from fixed current source 24 to coil 22a through switch 29, amplifier 32 and potentiometer 19. In addition switch 37 is closed so that sine wave generator 36 provides a constant frequency signal $\omega$ to coil 22b. The signals from coils 22a and 22b combined with the ambient field is applied to total field magnetometer 10 and fed back to servometer 18 through filter 16 and amplifier 17. Servomotor 18 then repositions potentiometer 19 so as to minimize its input signal in a manner well known in the art.

Figure 3B:
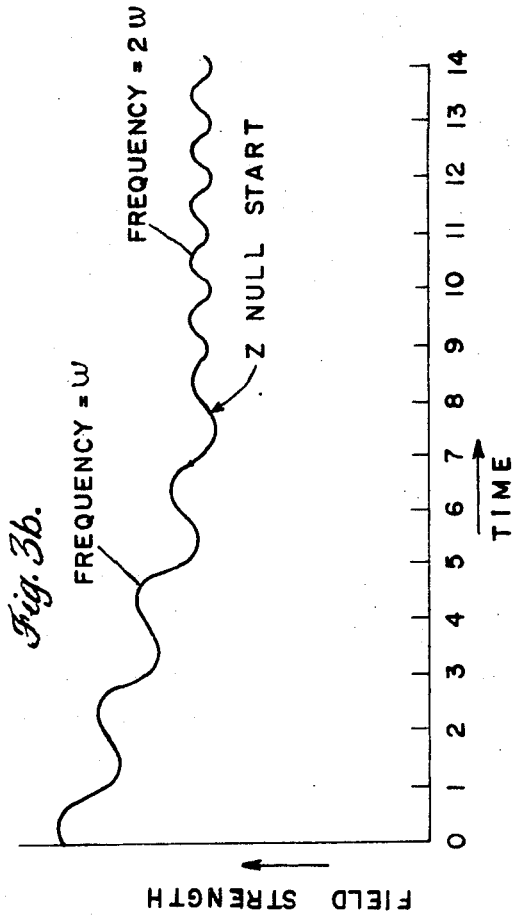
FIGS. 3a and 3b represent typical parameters as applied to the magnetic navigation system of FIG. 1.
Figure 3A:
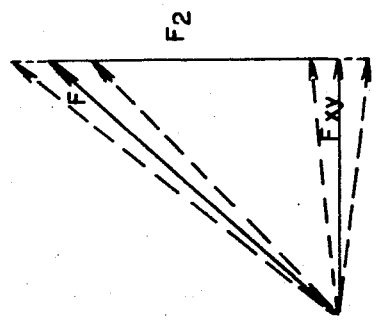

The magnitude of the field $F$ sensed by magnetometer 10 is shown in FIG. 3a with the dotted lines representing the variance in $F$ as the sine wave signal $\omega$ is applied to coil 22b. FIG. 3b shows the magnitude of the field $F$ decreasing as a function of time as the $F_z$ component sensed by magnetometer 10 is being nulled by the repositioning of potentiometer 19 by servometer 18. Referring back to FIG. 3a there is shown the component $F_{xy}$, which represents the magnitude of the field $F$ when the vertical component $F_z$ has been nulled. It is to be noted that the signal $\omega$ when varying $F_{xy}$ increases the value of $F_{xy}$ whether going positive or negative. This is shown in FIG. 3b at time increment 8 where it can be seen that the field is varying at a frequency of $2\omega$.

When the $F_z$ field is nulled the filter 16 blocks the frequency $2\omega$ received from magnetometer 10 stopping the servomotor 18. The modulating signal source 36 is then removed by opening switch 37 and the $F$ signal which is now the magnitude of the horizontal component of the earth's magnetic field $F_{xy}$ is recorded and stored in the memory of computer 12.

A fixed current is then provided from source 24 to either of coils 20 or 21 through respective switches 27 or 28. For example, a fixed current is applied to coil 20 to vary the $F_x$ field sensed by magnetometer 10. On sensing a change in signal due to the current applied to coil 20, magnetometer 10 provides a new signal $F'_{xy}$ to computer 12. The computer performs the computation $F_{xy} - F'_{xy}$ to obtain a value $\Delta F_{xy}$ which the computer 12 stores. In addition the computer receives and stores the angle $TH$ directly from gyro 34.

The declination angle $D$ may then be solved by the computer 12 using equation (6).

The computer 12 then provides a readout of the total earth's ambient field $F$, inclination angle $I$, horizontal component of the total field $F_{xy}$, vertical component of the total field $F_z$ and declination angle $D$.

It has therefore been shown that five parameters of the earth's ambient field may be obtained. The computer 12 provides a readout of all these values by using the information provided and making simple arithmetic computations. The programs for providing these computations and readouts are not shown as all are well within the skill of those in the art. The readouts are then compared with maps and charts that are readily available showing the five parameters so that a determination of the location of the vehicle may be made.

An essential feature of the device is that it makes use of the nonsymmetrical nature of the earth's magnetic field over the surface of the earth. Thus the five parameters of the earth's magnetic field, namely, total field, its vertical and horizontal components, the angles of inclination and declination form contours which are unique to most of the regions of the earth.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A magnetic navigation system comprising:
   first means for determining the total ambient earth's magnetic field including a total field optically pumped magnetometer for generating a first output signal indicative of the total field strength; and second means connected to receive the output signal of said magnetometer for providing a first compensation signal to said first means whereby said first means provides a second output signal indicative of the horizontal component of the total field strength.

2. A magnetic navigation system according to claim 1 wherein said second means further comprises:
a bandpass filter connected to receive the signal from said magnetometer;
a servomotor operatively connected to said filter for being driven by the output of said filter when the output exceeds a predetermined level;
a potentiometer mechanically connected to the output of said servomotor for being positioned by said servomotor;
a fixed current source being provided to the input of said potentiometer;
coil means connected to the output of said potentiometer and positioned to provide a field flux to said magnetometer along a predetermined axis; and
signal generating means connected to said coil means for providing an electrical signal of the same frequency as the bandpass of said filter.

3. A magnetic navigation system according to claim 2 wherein said coil means further comprises:
a first Helmholtz coil connected to receive the output of said potentiometer; and
a second Helmholtz coil connected to receive the output of said signal generating means.

4. A magnetic navigation system according to claim 3 further comprising:
a first switch interposed between said signal generating means and said second Helmholtz coil; and
a second switch interposed between said fixed current source and said potentiometer.

5. A magnetic navigation system according to claim 4 further comprising:
third means including a shunting switch interposed between said second switch and said first Helmholtz coil across said potentiometer for providing a known second compensation signal to said magnetometer along a vertical axis.

6. A magnetic navigation system according to claim 5 further comprising:
computer means operatively connected to the output of said magnetometer arranged for solving the equations:

$$\Delta F = |F| - |F'|$$

wherein $F$ is the value of the output signal of the magnetometer indicative of the total ambient earth's magnetic field and $F'$ is the output signal of the magnetometer after the second compensation signal has been provided, $$I = \sin^{-1} \Delta F / \Delta F_z$$

wherein $\Delta F_z$ is the value of the second compensation signal provided to the magnetometer and $I$ is the inclination angle, and $$F_z = F \sin I$$

wherein $F_z$ is the vertical component of the ambient earth's magnetic field.

7. A magnetic navigation system according to claim 6 further comprising:
fourth means operatively connected to provide a known third compensation signal to said magnetometer along a horizontal axis.

8. A magnetic navigation system according to claim 7 wherein said fourth means further comprises:
a third switch connected to said fixed current source; and
a third Helmboltz coil in orthogonal relationship to said first and second Helmholtz coils connected to said third switch.

9. A navigation system according to claim 8 further comprising:
a directional gyro operatively connected to said computer means for providing a signal indicative of true heading.

10. A navigation system according to claim 9 wherein said computer means is further arranged to solve the equations:

$$\Delta F_{xy} = |F_{xy}| - |F'_{xy}|$$

and $$D = TH - \cos^{-1} \Delta F_{xy} / \Delta F_x$$

wherein $F_{xy}$ is the horizontal component of the earth's ambient magnetic field, $F'_{xy}$ is the component sensed by the magnetometer after providing the third known compensation signal, $D$ is the declination angle, $TH$ is the true heading and $\Delta F_x$ is the known value of the third compensation signal.

* * * * *